Sept. 2, 1969           J. BERGER           3,464,763
PHOTOGRAPHIC OBJECTIVE HAVING A CONTINUOUSLY
VARIABLE FOCAL LENGTH
Filed March 30, 1966           2 Sheets-Sheet 1

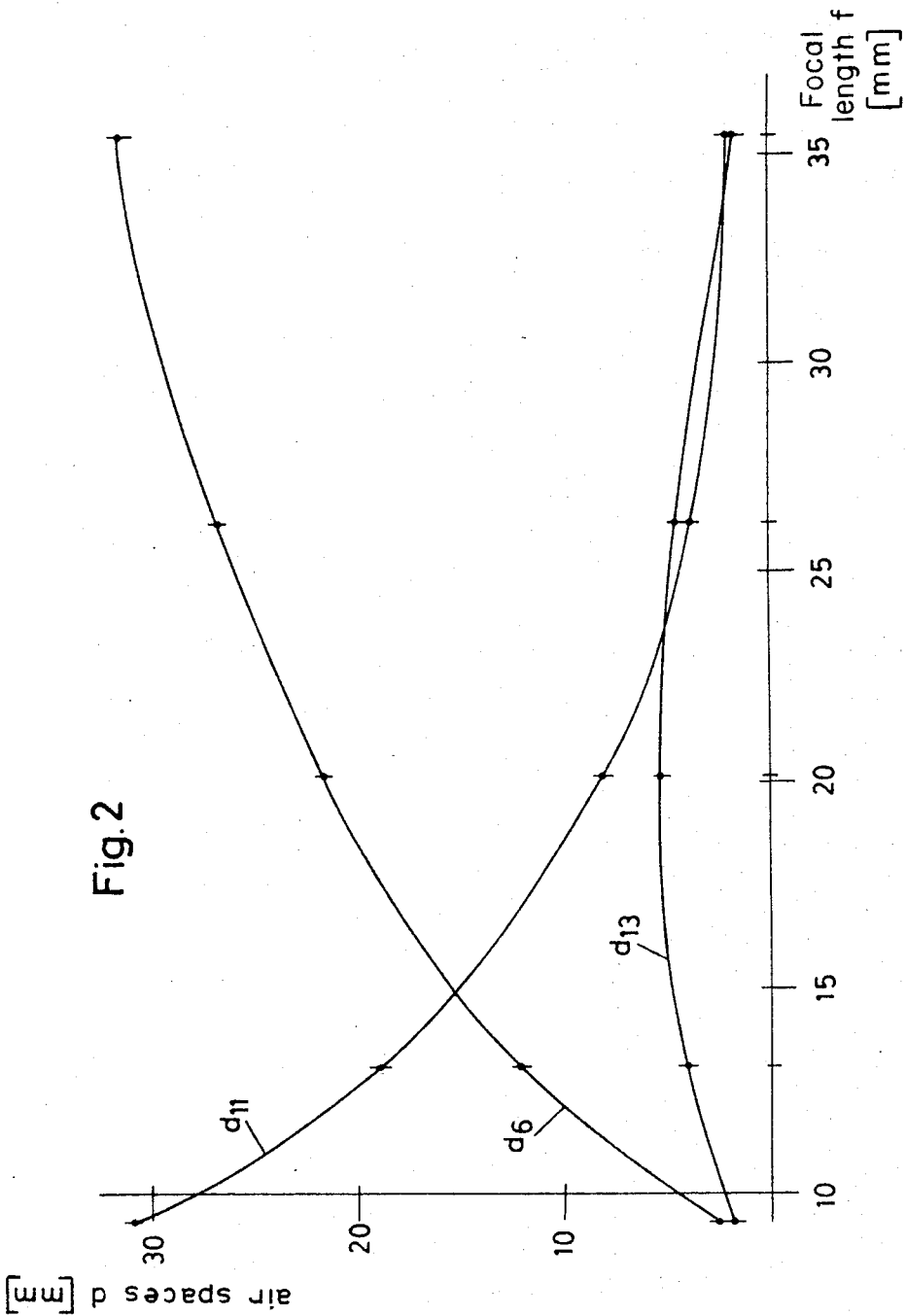

United States Patent Office 3,464,763
Patented Sept. 2, 1969

3,464,763
PHOTOGRAPHIC OBJECTIVE HAVING A CONTINUOUSLY VARIABLE FOCAL LENGTH
Johannes Berger, Heidenheim (Brenz), Germany, assignor to Carl Zeiss-Stiftung, doing business as Carl Zeiss, Heidenheim (Brenz), Wurttemberg, Germany, a corporation of Germany
Filed Mar. 30, 1966, Ser. No. 538,673
Claims priority, application Germany, Apr. 3, 1965, Z 11,452
Int. Cl. G02b 1/00, 9/00
U.S. Cl. 350—176        1 Claim

---

ABSTRACT OF THE DISCLOSURE

A photographic objective having a continuously variable focal length and comprising four axially aligned lens groups of which the first lens group is collective, the second lens group is dispersive, the third lens group is dispersive and the fourth lens group is collective, and in which the change in the focal length is effected by axially adjusting the two dispersive lens groups relatively to each other and relatively to the two collective lens groups along the optical axis of the objective.

---

The invention relates to a photographic objective having a continuously variable focal length.

It is an object of the invention to produce such an objective which has an aperture of at least $f:2$, an expansion range of about $9 < f < 36$ mm., an image diagonal of 7.2 mm. and a distance between the back lens and the image of at least 12 mm.

In the drawing:

FIG. 1 illustrates diagrammatically an axially taken sectional view of the photographic objective of the invention, and FIG. 2 is a graph illustrating the effect of the variable air spaces in the objective in relation to its variable focal length.

In the following table are given the data of a photographic objective which will fulfill the object of the present invention. Such an objective is composed of four lens groups as follows:

One collective first lens group A,
One dispersive second lens group B,
One dispersive third lens group C,
One collective fourth lens group D.

The change in the focal length is accomplished in known manner by axially displacing the two dispersive lens groups B and C relatively to one another and relatively to the two collective lens groups A and D along the optical axis of the objective. The movement progress is controlled in such a manner that the image of a fixed subject retains a fixed position with respect to the last lens group.

The specialty of the objective, the details of which are given in the following table consists in the combination of the following features:

(a) The collective first lens group consists of three individual lenses, namely of a dispersive meniscus-shaped first lens, a collective bi-convex second lens and a collective meniscus-shaped third lens; all of these members of the first lens group are curved in such a manner that for each member the relation $$b_\mathrm{v} - b_\mathrm{h} > 0$$

exists, wherein $b_\mathrm{v}$ is the refractive power of the front face and $b_\mathrm{h}$ is the refractive power of the rear face of the respective member.

(b) The dispersive second lens group consists of three lenses, namely of a dispersive first lens, a dispersive second lens and a collective third lens which is cemented to the dispersive second lens in such a manner that these two lenses together produce a dispersive member. The glass of the collective lens has a higher dispersion than the glass of the dispersive lens cemented to it. All of the members of the second lens group are curved in such a manner that for each of these members the relation $$b_\mathrm{v} - b_\mathrm{h} > 0$$

exists.

(c) The dispersive third lens group consists of a meniscus-shaped dispersive lens whose convex surface is directed toward the diaphragm.

(d) The collective fourth lens group contains at least three collective lenses of which one is arranged in front of the diaphragm and it contains also at least two dispersive lenses of which one lens is arranged directly in rear of the diaphragm; the dispersive lens positioned directly in rear of the diaphragm is curved meniscus-like and its concave surface faces the diaphragm; in rear of this dispersive lens are arranged at least two collective lenses.

If it is desired to employ a portion of the light rays entering the objective for view finder purposes, it would be possible to arrange within the fourth lens group a reflective square with inclined mirror faces. This type of beam splitter is preferably arranged directly in front of the conventional iris diaphragm.

| Lenses | Radii | Axial Distances | $n_e$ | $\nu_e$ |
|---|---|---|---|---|
| $L_I$ | $r_1 = 112.200$ | $d_1 = 3.00$ | 1.79180 | 25.90 |
|  | $r_2 = 46.976$ | $d_2 = 1.20$ |  |  |
| $L_{II}$ | $r_3 = 50.119$ | $d_3 = 8.70$ | 1.62287 | 60.06 |
|  | $r_4 = -110.600$ | $d_4 = 0.05$ |  |  |
| $L_{III}$ | $r_5 = 33.982$ | $d_5 = 3.50$ | 1.62280 | 60.06 |
|  | $r_6 = 47.657$ | $d_6 = \begin{cases} 2.50 \\ 12.10 \\ 21.65 \\ 26.60 \\ 31.50 \end{cases}$ |  |  |
| $L_{IV}$ | $r_7 = -139.240$ | $d_7 = 1.00$ | 1.69400 | 54.60 |
|  | $r_8 = 24.582$ | $d_8 = 3.50$ |  |  |
| $L_V$ | $r_9 = 930.570$ | $d_9 = 0.80$ | 1.52010 | 65.01 |
| $L_{VI}$ | $r_{10} = 14.855$ | $d_{10} = 3.50$ | 1.79180 | 25.90 |
|  | $r_{11} = 24.406$ | $d_{11} = \begin{cases} 30.971 \\ 19.078 \\ 8.223 \\ 3.951 \\ 1.910 \end{cases}$ |  |  |
| $L_{VII}$ | $r_{12} = -22.876$ | $d_{12} = 1.30$ | 1.66151 | 50.69 |
|  | $r_{13} = -51.582$ | $d_{13} = \begin{cases} 1.724 \\ 4.017 \\ 5.322 \\ 4.644 \\ 1.785 \end{cases}$ |  |  |
| $L_{VIII}$ | $r_{14} = 28.799$ | $d_{14} = 2.50$ | 1.69400 | 54.60 |
|  | $r_{15} = -35.995$ | $d_{15} = 0.70$ |  |  |
| $L_{IX}$ | $r_{16} = \infty$ | $d_{16} = 5.00$ | 1.57832 | 41.04 |
|  | $r_{17} = \infty$ | $d_{17} = 4.00$ |  |  |
| $L_X$ | $r_{18} = -8.2037$ | $d_{18} = 5.30$ | 1.74618 | 27.97 |
|  | $r_{19} = -11.971$ | $d_{19} = 5.10$ |  |  |
| $L_{XI}$ | $r_{20} = 87.852$ | $d_{20} = 2.80$ | 1.69400 | 54.60 |
|  | $r_{21} = -24.057$ | $d_{21} = 0.05$ |  |  |
| $L_{XII}$ | $r_{22} = 20.983$ | $d_{22} = 4.00$ | 1.69660 | 53.18 |
|  | $r_{23} = -14.125$ |  |  |  |
| $L_{XIII}$ | $r_{24} = 45.973$ | $d_{23} = 1.00$ | 1.81262 | 25.28 |

$s' = 15.2$ mm. back focal length.

The photographic objective having the above data as disclosed in the table has an aperture $f:1.9$ and an expansion range of $9.3 \leq f \leq 35.4$ mm.

The focal lengths of the individual lens groups have the following values:

$$f_A = 70.0 \text{ mm.}$$
$$f_B = -20.2 \text{ mm.}$$
$$f_C = -63.3 \text{ mm.}$$
$$f_D = 18.6 \text{ mm.}$$

The numerical values in the table for the variable air spaces correspond to the following focal lengths of the objective:

(1)      $f = 9.3$ mm.
(2)      $f = 13.2$ mm.
(3)      $f = 20.2$ mm.
(4)      $f = 26.2$ mm.
(5)      $f = 35.4$ mm.

FIG. 2 illustrates by means of a graph the change of the variable air spaces $d_6$, $d_{11}$ and $d_{13}$ in relation to the focal length of the objective.

Figure 1:
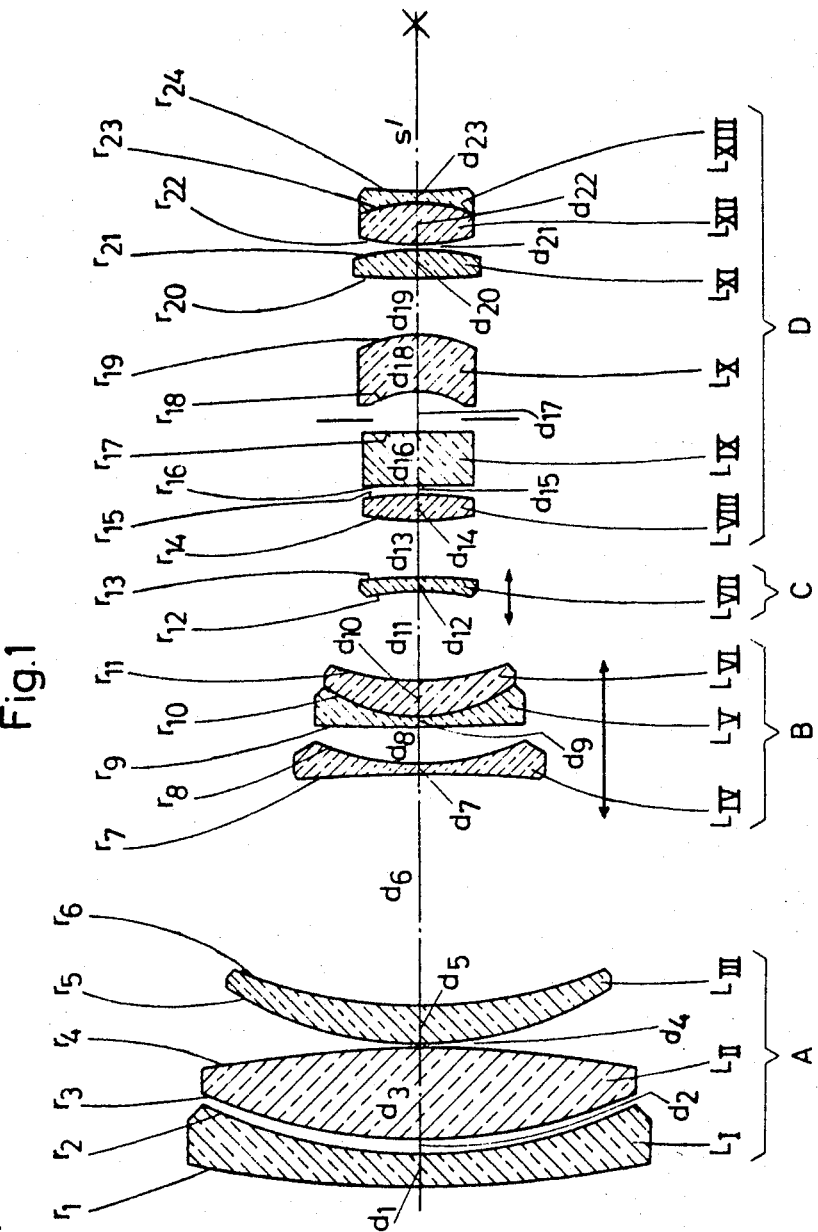
FIG. 1 illustrates an objective which corresponds to the values given in the above table for the position in which the focal length of the objective is $f = 20.2$ mm.

What I claim is:

1. In a photographic objective having a continuously variable focal length comprising four axially aligned lens groups of which the first lens group (A) is collective, the second lens groups (B) is dispersive, the third lens group (C) is dispersive and the fourth lens group (D) is collective, the change in the focal length being effected by axially adjusting said two dispersive lens groups relatively to each other and relatively to said two collective lens groups along the optical axis of the objective, the collective first lens group consisting of three individual lenses, namely of a dispersive meniscus-shaped first lens, a collective bi-convex second lens and a collective meniscus-shaped third lens, all of these members of the first lens group being curved in such a manner that for each member the relation $$b_v - b_h > 0$$

exists, the dispersive second lens group consisting of three lenses, namely of a dispersive first lens, a dispersive second lens and a collective third lens which is cemented to the dispersive second lens in such a manner that these two lenses together produce a dispersive member, the glass of the collective lens having a higher dispersion than the glass of the dispersive lens cemented to it, and all of the members of the second lens group being curved in such a manner that for each of these members the relation $$b_v - b_h > 0$$

exists, the dispersive third lens group consisting of a meniscus-shaped dispersive lens whose convex surface is directed toward the diaphragm, the collective fourth lens group containing at least three collective lenses of which one is arranged in front of the diaphragm and contains also at least two dispersive lenses of which one lens is arranged directly in rear of the diaphragm, said last named dispersive lens being curved meniscus-like and its concave surface facing the diaphragm, in rear of this dispersive lens being arranged at least two collective lenses, the improvement comprising that the data of the objective have numerical values substantially as given in the following table:

| Lenses | Radii | Axial Distances | $n_e$ | $\nu_e$ |
|---|---|---|---|---|
| $L_I$ | $r_1 = 112.220$ | $d_1 = 3.00$ | 1.79180 | 25.90 |
|  | $r_2 = 46.976$ | $d_2 = 1.20$ |  |  |
| $L_{II}$ | $r_3 = 50.119$ | $d_3 = 8.70$ | 1.62287 | 60.06 |
|  | $r_4 = -110.600$ | $d_4 = 0.05$ |  |  |
| $L_{III}$ | $r_5 = 33.982$ | $d_5 = 3.50$ | 1.62280 | 60.06 |
|  | $r_6 = 47.657$ | $d_6 = \begin{Bmatrix} 2.50 \\ 12.10 \\ 21.65 \\ 26.60 \\ 31.50 \end{Bmatrix}$ |  |  |
| $L_{IV}$ | $r_7 = -139.240$ | $d_7 = 1.00$ | 1.69400 | 54.60 |
|  | $r_8 = 24.582$ | $d_8 = 3.50$ |  |  |
| $L_V$ | $r_9 = 930.570$ | $d_9 = 0.80$ | 1.52010 | 65.01 |
|  | $r_{10} = 14.855$ |  |  |  |
| $L_{VI}$ | $r_{11} = 24.406$ | $d_{10} = 3.50$ | 1.79180 | 25.90 |
|  |  | $d_{11} = \begin{Bmatrix} 30.971 \\ 19.078 \\ 8.223 \\ 3.951 \\ 1.910 \end{Bmatrix}$ |  |  |
| $L_{VII}$ | $r_{12} = -22.876$ | $d_{12} = 1.30$ | 1.66151 | 50.69 |
|  | $r_{13} = -51.582$ | $d_{13} = \begin{Bmatrix} 1.724 \\ 4.017 \\ 5.322 \\ 4.644 \\ 1.785 \end{Bmatrix}$ |  |  |
| $L_{VIII}$ | $r_{14} = 28.799$ | $d_{14} = 2.50$ | 1.69400 | 54.60 |
|  | $r_{15} = -35.995$ | $d_{15} = 0.70$ |  |  |
| $L_{IX}$ | $r_{16} = \infty$ | $d_{16} = 5.00$ | 1.57832 | 41.04 |
|  | $r_{17} = \infty$ | $d_{17} = 4.00$ |  |  |
| $L_X$ | $r_{18} = -8.2937$ | $d_{18} = 5.30$ | 1.74618 | 27.97 |
|  | $r_{19} = -11.971$ | $d_{19} = 5.10$ |  |  |
| $L_{XI}$ | $r_{20} = 87.852$ | $d_{20} = 2.80$ | 1.69400 | 54.60 |
|  | $r_{21} = -24.057$ | $d_{21} = 0.05$ |  |  |
| $L_{XII}$ | $r_{22} = 20.983$ | $d_{22} = 4.00$ | 1.69660 | 53.18 |
|  | $r_{23} = -14.125$ | $d_{23} = 1.00$ | 1.81262 | 25.28 |
| $L_{XIII}$ | $r_{24} = 45.973$ |  |  |  |

$s' = 15.2$ mm. back focal length.

$r_1$ to $r_{24}$ being the radii of the lenses $L_I$ to $L_{XIII}$ respectively, $n_e$ being the refractive indices, $\nu_e$ being the Abbé numbers of the lenses, $d_1$ to $d_{23}$ being the axial distances with the five values given for $d_6$, $d_{11}$ and $d_{13}$ corresponding respectively to the following five focal lengths of the objective, viz., $F = 9.3$ mm., $F = 13.2$ mm., $F = 20.2$ mm., $F = 26.2$ mm., and $F = 35.4$ mm., and $s'$ being the distance between the back lens and the image plane.

References Cited

UNITED STATES PATENTS 3,366,437    1/1968    Moriyama et al. _____ 350—186

FOREIGN PATENTS 942,966    11/1963    Great Britain.
975,309    11/1964    Great Britain.

DAVID SCHONBERG, Primary Examiner
R. J. STERN, Assistant Examiner

U.S. Cl. X.R.
350—184, 214